United States Patent
Eriksson et al.

(10) Patent No.: US 7,946,954 B2
(45) Date of Patent: May 24, 2011

(54) METHOD FOR ACTIVATING A FREEWHEEL FUNCTION IN A VEHICLE

(75) Inventors: Anders Eriksson, Torslanda (SE); Sixten Berglund, Torslanda (SE); Peter Templin, Västra Frölunda (SE)

(73) Assignee: Volvo Lastvagnar AB, Gothenburg (SE)

( * ) Notice: Subject to any disclaimer, the term of this patent is extended or adjusted under 35 U.S.C. 154(b) by 747 days.

(21) Appl. No.: 12/066,097

(22) PCT Filed: Aug. 30, 2006

(86) PCT No.: PCT/SE2006/001000
§ 371 (c)(1),
(2), (4) Date: Mar. 7, 2008

(87) PCT Pub. No.: WO2007/030056
PCT Pub. Date: Mar. 15, 2007

(65) Prior Publication Data
US 2008/0242503 A1 Oct. 2, 2008

Related U.S. Application Data

(60) Provisional application No. 60/596,204, filed on Sep. 8, 2005.

(51) Int. Cl.
*B60W 10/00* (2006.01)
(52) U.S. Cl. ........................................................ 477/92
(58) Field of Classification Search .................. None
See application file for complete search history.

(56) References Cited

U.S. PATENT DOCUMENTS

| 7,223,204 B2 * | 5/2007 | Steen et al. ............ 477/97 |
| 2009/0318263 A1 * | 12/2009 | Yuet et al. ............. 477/92 |
| 2010/0152990 A1 * | 6/2010 | Bjernetun et al. ............. 701/93 |

FOREIGN PATENT DOCUMENTS

| SE | 525309 C2 | 1/2005 |
| WO | 0192048 A1 | 12/2001 |
| WO | 02092378 A1 | 11/2002 |

OTHER PUBLICATIONS

International Search Report for corresponding International Application PCT/SE2006/001000.

* cited by examiner

Primary Examiner — Dirk Wright
(74) Attorney, Agent, or Firm — WRB-IP LLP

(57) ABSTRACT

A method for activating a freewheel function of a vehicle, where the vehicle is equipped with an auxiliary brake, an auxiliary braking control for controlling the braking power of the auxiliary brake between an auxiliary brake not-active position and at least one auxiliary brake active position, at least one engine, at least one wheel driven by the engine via an automated mechanical transmission, an accelerator pedal for controlling the driving torque of the engine. When deactivation of the auxiliary brake occurs due to manual positioning of the auxiliary braking control to the auxiliary brake not-active position, the freewheel function is automatically activated if a freewheeling condition is sensed.

3 Claims, 1 Drawing Sheet

METHOD FOR ACTIVATING A FREEWHEEL FUNCTION IN A VEHICLE

The present application is the U.S. National Stage application for PCT/SE2006/001000, filed Aug. 30, 2006, which claims priority to U.S. Provisional Application 60/596,204, filed Sep. 8, 2005.

BACKGROUND AND SUMMARY

The present invention relates to a method for automatically activating freewheeling in a vehicle.

Automatic transmissions of the Automated Mechanical Transmission (AMT) type have become increasingly common in heavy-duty vehicles as microcomputer technology has continued to advance and has made it possible, with a control computer and a number of control elements, for example servo motors, to precision control the engine speed, the connection and disconnection of an automated clutch between engine and gearbox and clutch members of the gearbox, relative to one another, so that smooth gear shifting is always obtained at the correct rev speed. The advantage with this type of automatic transmission compared to a traditional automatic transmission based on a set of planetary gears and with a hydrodynamic torque converter on the input side is firstly that, particularly as regards use in heavy vehicles, it is simpler and more robust and can be produced at substantially lower cost, and secondly that it has higher efficiency, which means the prospect of lower fuel consumption.

A traditional automatic transmission based on a set of planetary gears may have one-way clutches between the planetary gear sets, which transmit torque from the engine to the wheels when the wheels are driven by the engine, but which, when torque is transmitted in the opposite direction (i.e. at zero throttle and with the vehicle in motion) disengage and cause the vehicle to freewheel without engine braking, which, by utilizing the kinetic energy of the vehicle, yields lower fuel consumption than if the engine is braking.

A corresponding freewheel function for automated mechanical transmissions is shown by WO02/092378. Here, a freewheel function is obtained by putting a splitter gear disposed in the gearbox into its neutral position when an accelerator pedal (gas pedal) disposed in the vehicle is located within a predetermined swivel angle range, which starts at a distance from the rest position of the pedal and extends over a slight angle within the total swivel angle of the pedal. When the driver wishes to change the driving condition from driving engine to allowing the vehicle to freewheel without engine braking, he lets up on the accelerator pedal so that it reaches the predetermined range when the drive from the engine is broken. If engine braking is required, he further releases the gas pedal, either fully or, in any event, to the point where it passes through the predetermined range within which disengagement occurs.

When a vehicle is equipped with an auxiliary brake, such as an engine brake, for example an exhaust gas pressure regulator or compression brake, or a hydraulic or electric retarder, this type of brake is often used when the vehicle is coasting. The inclination of the downhill slope can sometimes vary and if the driver wants to hold a certain vehicle speed through the whole varied down slope he often uses the auxiliary brake to hold the vehicle speed and to save the service brakes. This means that if the downhill slope varies the driver may have to repeatedly engage and disengage the auxiliary brake, or adjust it between different braking power levels and even turn the auxiliary brake to the off position at times, for example if the inclination of the downhill slope becomes relatively small.

Many times, a situation occurs just after disengagement of the auxiliary brake when freewheeling would be advantageous because at a minimum, it would save fuel. According to known techniques, in order to activate the freewheel function just after disengagement of the auxiliary braking power the driver has to press the accelerator pedal slightly (i.e. within said predetermined swivel angle range, see WO02/092378) and then, as soon as possible, release the accelerator pedal. This is counterintuitive and unnatural for the driver to have to press the accelerator pedal for freewheel activation when traveling downhill and the driver desires to hold a certain vehicle speed.

An object of the present invention is therefore to improve the procedure and eliminate the unnatural feeling of having to press the accelerator pedal for activating the freewheel function just after the auxiliary brake has been deactivated. Another object is to improve fuel economy.

The method according to the present invention is a method for activating a freewheel function of a vehicle, where the vehicle is equipped with an auxiliary brake. An auxiliary brake control is included for controlling the braking power of the auxiliary brake by positioning the auxiliary brake control between an auxiliary brake "not-active" position and at least one auxiliary brake "active" position. The method is characterized in that when deactivation of the auxiliary brake occurs due to manual positioning of the auxiliary brake control to the auxiliary brake not-active position, the freewheel function is automatically activated if freewheeling condition is sensed.

The advantage with the method according to the invention is that the driver would not need to press the accelerator pedal slightly and then as soon as possible release the accelerator pedal to activate freewheeling. The handling of the vehicle will be simplified and fuel consumption will be decreased due to the automatic freewheel activation according to the invention.

According to one aspect of a method according to the invention, the sensed freewheeling condition includes at least sensing that an accelerator pedal for controlling the driving torque of an engine in the vehicle is released and that a brake pedal for controlling service brakes in the vehicle is also released. This gives a natural procedure for the driver to activate the freewheeling function just by positioning the auxiliary brake control in the auxiliary brake not-active position and not touching the accelerator pedal and brake pedal.

BRIEF DESCRIPTION OF THE DRAWINGS

The present invention will be described in greater detail below with reference to the accompanying drawing which, for the purpose of exemplification, shows further preferred embodiments of the invention and also the technical background, and wherein.

DETAILED DESCRIPTION

Figure 1:
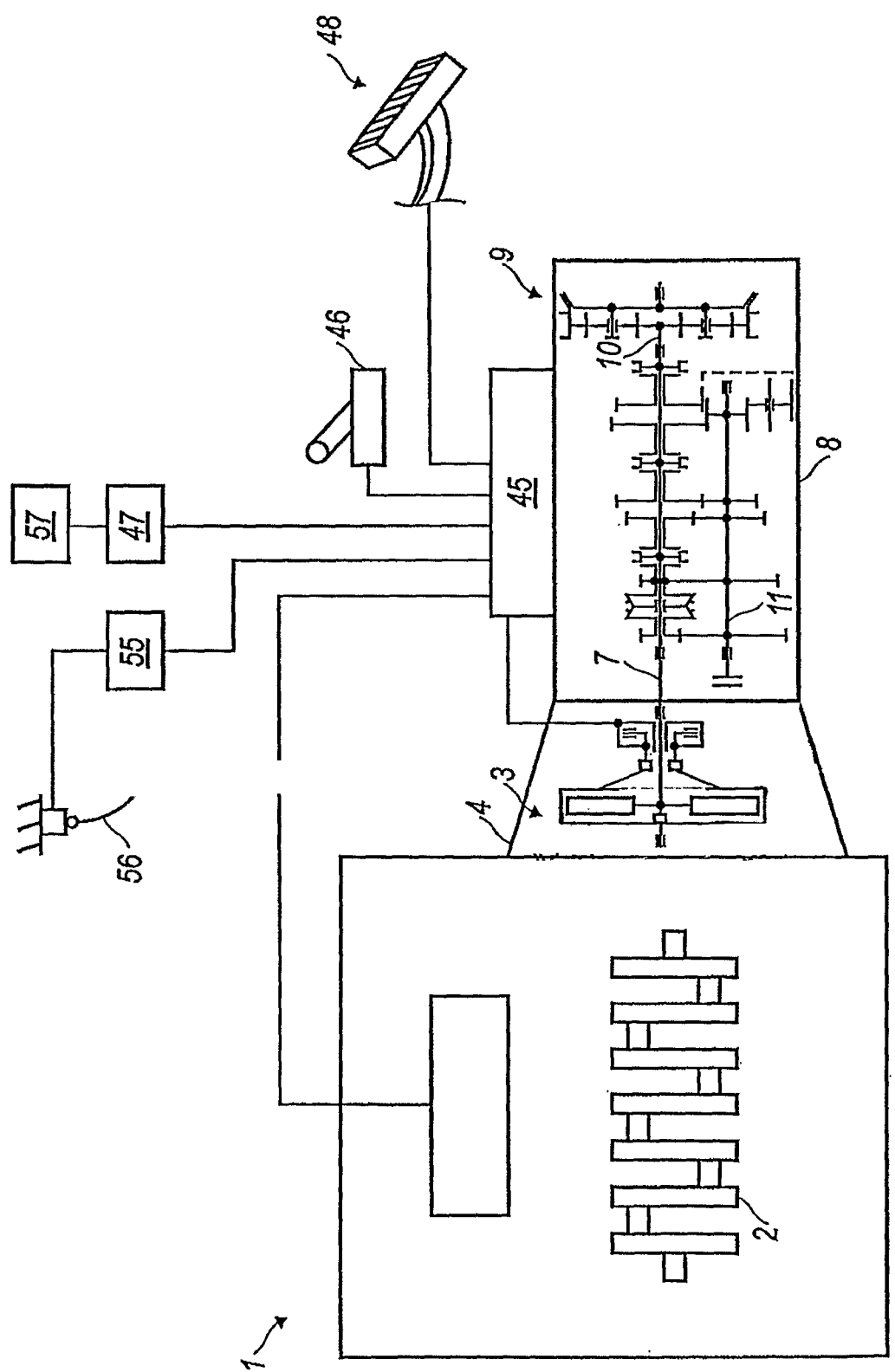
FIG. 1 is a schematic diagrammatically illustrating one embodiment of the presently disclosed invention.

FIG. 1 discloses one embodiment of a vehicle equipped with an internal combustion engine 1, for example a diesel engine, with a crankshaft 2 which is coupled to a single-disk dry plate clutch 3, which is enclosed in a clutch case 4. The crankshaft 2 is connected, non-rotatably, to an input shaft 7, which is rotatably mounted in the housing 8 of a gearbox 9. Also rotatably mounted in the gearbox housing 8 are a main shaft 10 and a countermediate shaft 11. A gear wheel is rotatably mounted on the input shaft and can be locked on the shaft with the aid of a synchronizing device provided with a coupling sleeve, which is mounted in a non-rotatable, but axially displaceable manner on a hub connected, non-rotatably, to the input shaft. With the aid of the coupling sleeve, a gear wheel rotatably mounted on the main shaft can be locked relative to the input shaft. With the coupling sleeve in a middle position, both of the gearwheels are disengaged from their respective shafts. The above mentioned gear wheels, together with the synchronizing device and the coupling sleeve, form a splitter gear.

Disposed in a rotationally secure manner on the countershaft 11 are further gear wheels, which each engage with a respective gear wheel that is rotatably mounted on the main shaft 10, which latter gear wheels can be locked on the main shaft with the aid of further coupling sleeves. An output end of the main shaft 10 is arranged to, via a propeller shaft, drive a pair of wheels.

All coupling sleeves are displaceable with the aid of servo elements, which can be pneumatically operated piston cylinder devices of the type utilized in a transmission of the kind described above, which is marketed under the trade name, I-SHIFT. The servo elements are controlled in a known manner by a control unit 45.

The torque delivered from the engine 1 is controlled by an accelerator pedal 48 in a known manner. A service brake system 55 is arranged in the vehicle and is controlled by a brake pedal 56 in a known manner.

An auxiliary brake 57 arranged in the vehicle can be an exhaust brake, an engine compression brake (see e.g., U.S. Pat. No. 5,146,890), hydraulic retarder or electric retarder. A combination of the mentioned types of auxiliary brake could also be possible to arrange in the vehicle according to the invention. The auxiliary brake 57 is controlled through an auxiliary brake control 47, which could be a lever or switch with positions for "auxiliary brake not-active" and "auxiliary brake active". The active position can include several positions for different auxiliary braking power levels.

The control unit 45 in the vehicle is, according to one embodiment of the invention, programmed to activate the freewheel function when sensing that: (i) the auxiliary brake control 47 has been moved from an auxiliary brake active position to an auxiliary brake not-active position, (ii) the accelerator pedal 48 for regulating the driving torque of the engine 1 is released, and (iii) the brake pedal 56 for controlling service brakes in the vehicle is released.

When the freewheeling function is activated, the synchronized splitter gear is disengaged in the gearbox 8 in order to achieve the freewheel function. In alternative embodiments, other means, such as the clutch 3, can also be used for disengaging the engine from the drive wheels of the vehicle to achieve the freewheel function.

The accelerator pedal position is obtained from an angle sensor 49. The control unit 45 also controls the fuel injection (i.e. the engine speed and torque) depending on the accelerator pedal position, and the air supply to pneumatic piston-cylinder devices, by means of which such systems as the clutch 3 and synchronized splitter gear are controlled.

The control unit is programmed to deactivate the freewheeling function when the driver either requests auxiliary braking power by moving the auxiliary brake control 47 to an auxiliary brake active position or by depressing the accelerator pedal 48 so that it is moved past the freewheel sector or if the service brake pedal 56 is depressed. The control unit 45 first controls the engine speed to an rpm which makes synchronization possible and the engaging sleeve is thereafter displaced to its former engagement position. The driveline is now engaged and driving or engine braking is now possible again.

A safety function is also programmed into the control unit 45; if the engine 1 should stall when the freewheel function is activated, the control unit 45 will then send a signal to first release the clutch 3 between the engine and the gearbox and thereafter displace the engaging sleeve from its neutral position to its previous engaged position.

After engagement of the synchronized gear, the control unit 45 provides a signal to reengage the clutch 3. When the clutch is engaged, the engine is driven by the vehicle and any auxiliary units such as servo-pumps and engine brakes, normally driven by the engine are now driven by the vehicle via the engine.

The invention should not be deemed to be limited to the embodiments described above, but rather a number of further variants and modifications are conceivable within the scope of the patent claims.

The invention claimed is:

1. A method for activating a freewheel function in a vehicle, where the vehicle is equipped with an auxiliary brake, an auxiliary brake control for controlling the braking power of the auxiliary brake by positioning the auxiliary brake control between an auxiliary brake not-active position and at least one auxiliary brake active position, the method being comprising, when deactivation of the auxiliary brake occurs due to manual positioning of said auxiliary brake control to the auxiliary brake not-active position, automatically activating the freewheel function activated if a freewheeling condition is sensed.

2. The method as recited in claim 1, wherein the sensed freewheeling condition includes at least sensing that an accelerator pedal for controlling a driving torque of an engine in the vehicle is released.

3. The method as recited in claim 2, wherein the sensed freewheeling condition also includes sensing that a brake pedal, for controlling service brakes in the vehicle, is released.

* * * * *